(12) United States Patent
Meade, II

(10) Patent No.: US 11,511,325 B2
(45) Date of Patent: Nov. 29, 2022

(54) AGRICULTURAL PRODUCTION SYSTEM AND METHOD

(71) Applicant: AG CARBON FARMS LLC, Orlando, FL (US)

(72) Inventor: James M Meade, II, Orlando, FL (US)

(73) Assignee: Ag Carbon Farms LLC, Orlando, FL (US)

( * ) Notice: Subject to any disclaimer, the term of this patent is extended or adjusted under 35 U.S.C. 154(b) by 0 days.

(21) Appl. No.: 17/407,645

(22) Filed: Aug. 20, 2021

(65) Prior Publication Data

US 2022/0055082 A1 Feb. 24, 2022

Related U.S. Application Data

(60) Provisional application No. 63/068,016, filed on Aug. 20, 2020.

(51) Int. Cl.
*B09B 1/00* (2006.01)

(52) U.S. Cl.
CPC ................................ *B09B 1/00* (2013.01)

(58) Field of Classification Search
CPC ....................................................... B09B 1/00
See application file for complete search history.

(56) References Cited

FOREIGN PATENT DOCUMENTS

| CN | 103084368 A | * | 5/2013 |
| KR | 101097919 B1 | * | 12/2011 |

OTHER PUBLICATIONS

Zeng "Carbon sequestration via wood burial" Carbon Balance and Management 2008 3:1 (Year: 2008).*

* cited by examiner

*Primary Examiner* — Janine M Kreck
(74) *Attorney, Agent, or Firm* — Olive & Olive, P.A.

(57) ABSTRACT

A method of carbon and nitrogen sequestration includes excavating a ditch around a plot of land selected for use in carbon and nitrogen sequestration. Pumping out water filling the ditch from the ground water table. When material in the plot is dry, excavating material from the plot to a desired depth, and thereafter filling the excavated plot with organic material to sequester carbon and nitrogen in the organic material therein.

5 Claims, 3 Drawing Sheets

AGRICULTURAL PRODUCTION SYSTEM AND METHOD

FIELD OF THE INVENTION

This invention relates to an agricultural production system and method. More specifically, the invention relates to a method and system for sequestering carbon and nitrogen in an agricultural production system.

BACKGROUND OF THE INVENTION

To mitigate global climate change, a portfolio of strategies will be needed to keep the atmospheric CO2 concentration below a dangerous level. A carbon sequestration strategy has been proposed in which certain dead trees, stumps, and tree trimmings ("wood") are harvested via collection or selective cutting, are stowed away and seasoned in above-ground stockpiles then buried in an excavated agricultural area. Anaerobic conditions are established in the underground excavated area. The thus established anaerobic conditions under a sufficiently thick layer of soil prevent the decomposition of the stored or buried wood. By the term "anaerobic conditions" is meant conditions effective to prevent the substantial decomposition of the stored or buried wood. Because a large flux of CO2 is constantly being assimilated into the world's forests via photosynthesis, cutting off its return pathway to the atmosphere forms an effective carbon sink.

It is estimated that a sustainable long-term carbon sequestration potential for wood burial is 10±5 GtC y−1, and currently about 65 GtC is on the world's forest floors in the form of coarse woody debris suitable for burial. The potential is largest in tropical forests (4.2 GtC y−1), followed by temperate (3.7 GtC y−1) and boreal forests (2.1 GtC y−1). This is all documented in a white paper by Professor Ning Zeng of the University of Maryland. Burying wood has other benefits including minimizing CO2 source from deforestation, extending the lifetime of reforestation carbon sink, and reducing fire danger.

Based on data from North American logging industry, the cost for wood burial is $14/tCO2($50/tC), lower than the typical cost for power plant CO2 capture with geological storage. The cost for carbon sequestration with wood burial is low because CO2 is removed from the atmosphere by the natural process of photosynthesis at little cost. The technique is low tech, distributed, easy to monitor, safe, and reversible, thus an attractive option for large-scale implementation in a world-wide carbon market.

The possibility of carbon sequestration via wood burial stems from the observation that a natural forest is typically littered with dead trees. It is hypothesized that large quantities of organic carbon were buried and preserved for over one hundred thousand years under the great Northern Hemisphere ice sheets during the Pleistocene glacial-interglacial cycles. Other studies have shown that organic matter, especially wood, in municipal landfills decomposes extremely slowly. With these, it becomes clear that wood harvesting and burial is a viable method for carbon sequestration.

With this in mind, there is described herein a method and system for carbon and nitrogen sequestration in an agricultural production system. The system will sequester carbon and slow the flow of and sequester nitrates using agricultural and urban wood and carbonaceous residuals that formerly had little value or use.

The system will create new revenues for agriculture in the form of carbon offset fees, wood residual handling fees, and fees from the construction industry for inorganic soil. The system will preserve the quality and nature of agricultural land as well as keep the land in agriculture.

SUMMARY OF THE INVENTION

This agricultural production system or carbon farming operation involves excavation of inorganic soil and replacing the void space with environmentally-friendly clean wood debris and organic residuals, which includes a fertile topsoil layer.

The materials to be used in this method are clean tree stumps, trunks and limbs, and other clean organic material. Other than separation of logs, vegetation and the like to place and compact into a stable below ground level layer, no additional processing of this material is required. This method provides an environmental benefit that increases proportionately with the increase in material(s) accepted so details on the specific amount of material is of no concern; specific materials may be relevant depending upon the application of the method and should be considered carefully, such as in conservation of sensitive ecological habitat within management-intensive, rotational, or other types of agricultural production systems. An operational site plan describing how the material will be received onto the site, how site access will be controlled, what equipment will be used to process or spread the urban organic residuals, and how the residuals will be stored prior to use is also explained in detail.

DETAILED DESCRIPTION OF EXEMPLARY EMBODIMENTS

Figure 1:
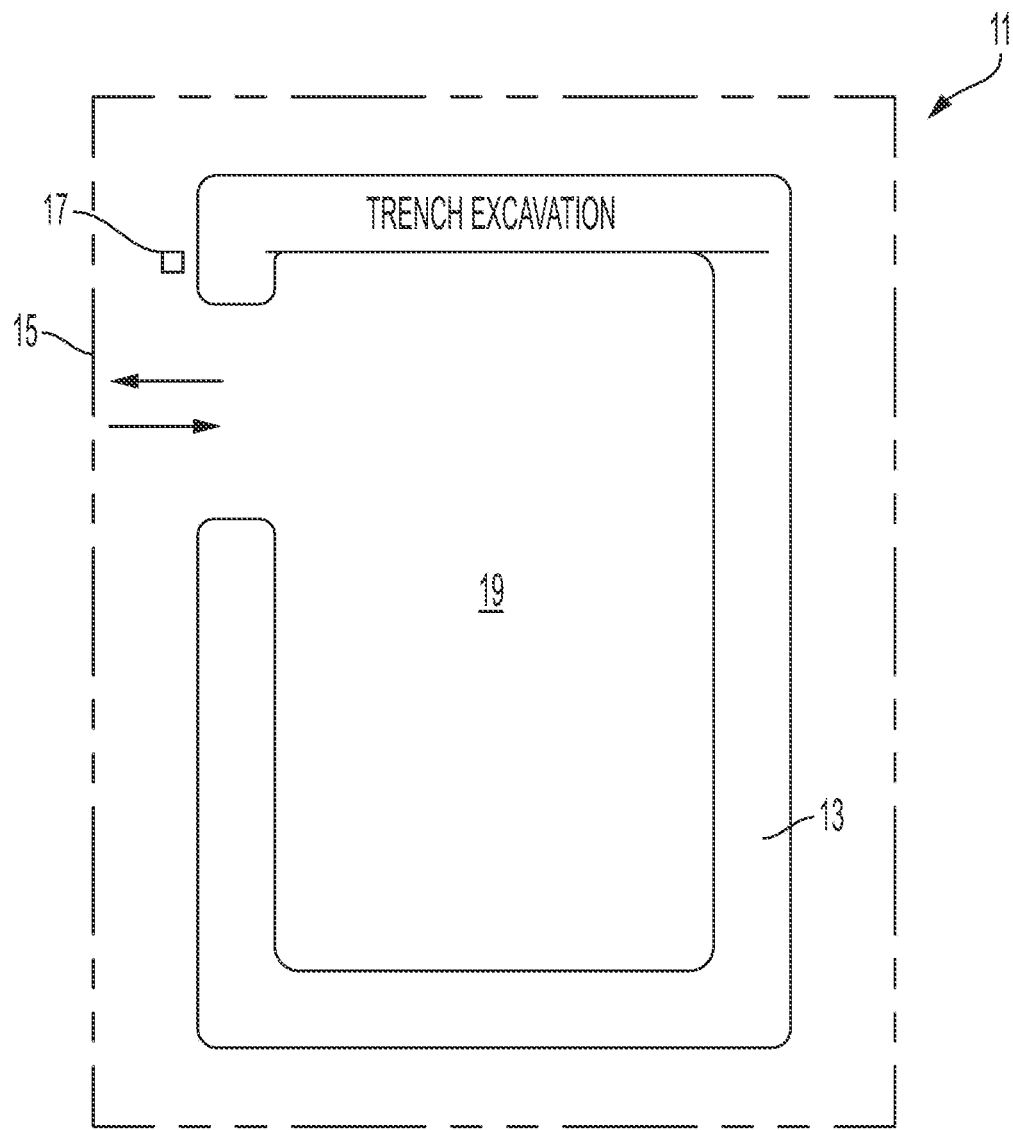
FIG. 1 is a schematic diagram showing a plot of land having a ditch excavated around the perimeter of farmland with an opening for truck access and a sump hole at one end for pumping groundwater out of the ditch.

Having briefly described the invention, the same will become better understood from the following detailed description As shown in FIG. 1, a ditch is excavated around the perimeter of an area of farmland 11 with an opening 15 providing an access route for truck access. A sump pump and hole 17 is provided at one end for pumping groundwater out of the ditch. Inorganic sands, clays, and soils removed from the farmland 11 to create the ditch are loaded onto dump trucks and hauled to construction projects. Water continues to be pumped to leave the remaining sand and soil inside of the farmland dry for excavation of the remainder 19 of the whole plot of land 11, and loaded on trucks for use at local construction projects. If the excavated materials contain sufficient fertile soils and organic materials, they may be retained instead of transported for use with the invention as described hereafter.

The above steps may be repeated to achieve a greater depth of excavation; the pumping of the water may continue or not depending on ground saturation and rainfall.

Next, in accordance with the Figures, local urban organic forestry residuals, clean land clearing materials, and other clean carbonaceous materials are selectively placed with the excavator with a thumb attachment to allow precise pickup and placement of logs, brush and other organic materials.

Figure 2:
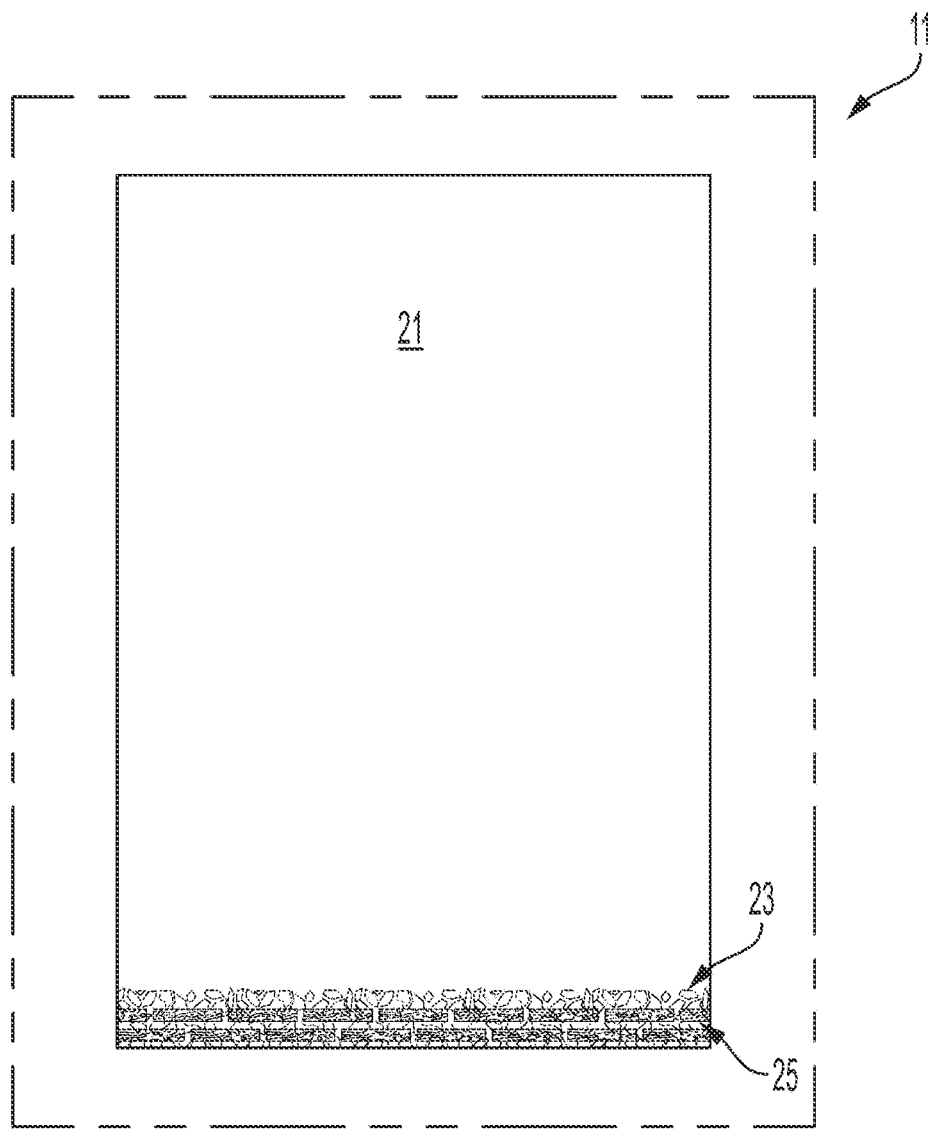
FIG. 2 is a schematic diagram showing the plot of land of FIG. 1 after having inorganic sands, clays and soils removed, water allowed to refill the excavated area, brush backfilled first at an edge of excavation, and logs and larger wood pieces placed onto the brush to retain the larger wood in place.
Figure 3:
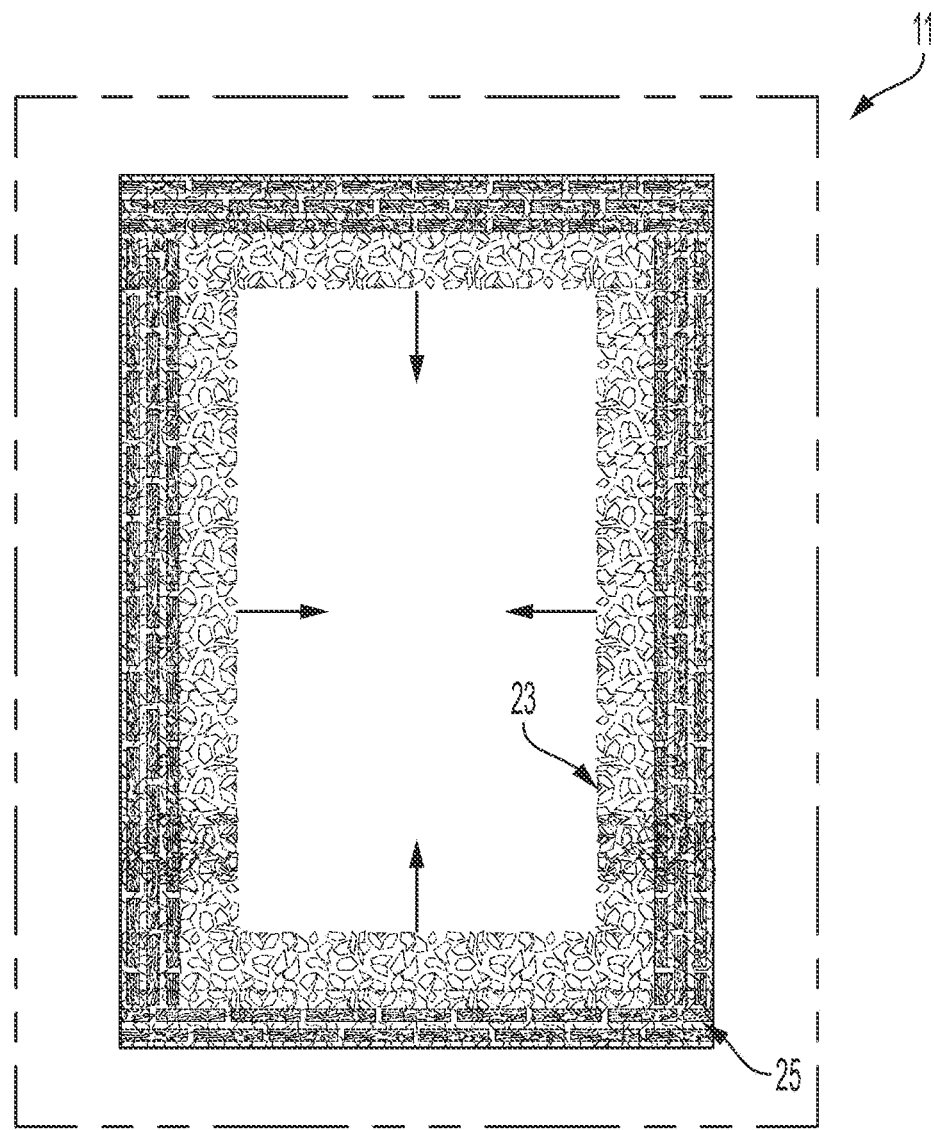
FIG. 3 is a schematic diagram showing how brush and logs are worked onto the excavation toward the center, and the last 18 to 24 inches of excavation is filled and made stable by filling with soil and organics such as mulch, peat and/or topsoil.

As shown in FIGS. 2 and 3, after full excavation eliminating the trench 13 as a result of excavation of the whole plot, an excavated region filled with water results Starting from the edge and moving inward, brush residuals 23 are first laid in loosely organized fashion in the excavated region 21 to result in a brush 13 layer. The brush 13 layer is then compacted by the excavator with thumb attachment. After compaction of the brush 13 layer, a layer of logs 25 and larger wood set in place in a "corduroy" fashion. This next layer is then compacted by the excavator with thumb attachment. This process is then repeated. Once the urban organic residuals or carbonaceous layers have been established to just above the water table, a layer of natural organic soil stockpiled on-site, or soils created by a proprietary method similar to that described in U.S. Pat. No. 5,558,694, the disclosure of which is specifically incorporated herein by reference is added to complete filling of the excavation. More specifically, the stockpiled material results from dry decay over time, typically for about six months sufficient to allow seasoning or drying and any residual agricultural chemicals to break down and be kept out of the ground.

More specifically, logs continue to be placed behind the leading edge of brush from all sides of a pond resulting from the excavation. Brush and logs are worked onto the excavation to the center until filled and stable. The remaining 18 to 24 inches are filled and compacted with clean organics and topsoil with mulch and peat components.

In order to implement the method and system, there is needed an appropriately sized excavator with thumb; farmland in proximity to construction projects or urban development in need of inorganic sands and soils; a sump pump; and a supply of wood, forestry and land clearing, or other clean carbonaceous residuals.

This system will perform the task of carbon sequestration in a cost-effective manner which is repeatable and beneficial to both independent and cooperative productive agricultural systems. The system and method will sequester carbon and will slow the flow of, filter, and sequester nitrates using agricultural and urban wood and carbonaceous residuals which formerly had little or negative value. The system and method will create new revenues for agriculture in the form of carbon offset fees, carbon tax credits, wood residual handling fees, and fees from the construction industry for inorganic soil. The system and method will preserve the quality and nature of agricultural land as well as keep the land in agriculture.

As previously described, this agricultural production system or carbon farming operation involves excavation of inorganic soil and replacing the void space with environmentally-friendly clean wood debris and organic residuals. The system and method provides a beneficial use that will not pose a threat to public health or the environment. The buried wood and brush is kept under anaerobic conditions to prevent the release of carbon dioxide. It is preferred that water rise in the excavated soil to ensure optimum anaerobic conditions, but the invention will also work in low water tables where the resultant anaerobic are not as effective. As a result, the method itself sequesters carbon, the need for which has been established in academic papers, and the Agricultural Improvement Act of 2018, herein known as the 2018 Farm Bill, as a significant benefit to the environment. No activities are to take place within the agricultural production system that have any negative impact on wetlands. The operation is intended for upland areas. However, the invention could be used in permitted wetlands.

Additional information on the specific layout of the activities for the method for carbon and nitrate sequestration in the agricultural production systems described in the following. The method of and equipment for this agricultural production system, as previously described and as shown with reference to FIGS. 1, 2, 3, has multi-modal economic and environmental benefits. Carbon sequestration is a defined public benefit. The materials to be used in this method are clean tree stumps, trunks and limbs, and other clean organic material which may previously have been considered solid waste. Other than separation, no additional processing of this material is required.

This method and system provide an environmental benefit that increases proportionately with the increase in material (s) accepted so details on the specific amount of material is of no concern; specific materials may be relevant depending upon the application of the method and should be considered carefully, such as in conservation of sensitive ecological habitat within management-intensive, rotational, or other types of agricultural production systems.

Having described the invention, it will be readily understood from the following in which it is described in a non-limiting manner.

The invention claimed is:

1. An agricultural method of carbon and nitrogen sequestration, comprising:
   a. selecting a plot of farmland to be used for carbon and nitrogen sequestration;
   b. excavating a ditch around the periphery of the plot and pumping out water filling the ditch from the ground water table;
   c. once inorganic material from the plot is dry, excavating inorganic material from the entire plot to a desired depth; and
   d. filling the excavated plot with; brush, logs and like clean organic materials to a level 18 to 24 inches below the original surface level of the plot.

2. The method of claim 1, wherein brush is first filled into the plot, and logs are layered on top of the brush to a level 18 to 24 inches below the original level of the plot.

3. The method of claim 2, further comprising filling and compacting the remaining 18 to 24 inches of excavated plot with topsoil type material.

4. The method of claim 3, further comprising planting grass or crops on the surface of the plot after filling to use the plot as agricultural land.

5. The method of claim 1, wherein water from the ground water table is allowed to fill the excavated plot to provide anaerobic conditions after the plot is filled.

* * * * *